Patented Mar. 25, 1947

2,417,999

UNITED STATES PATENT OFFICE 2,417,999

PREPARATION OF N,N'-METHYLENE BIS HYDANTOINS

Joseph Frederic Walker, Lewiston, N. Y., assignor to E. I. du Pont de Nemours & Company, Wilmington, Del., a corporation of Delaware No Drawing. Application February 7, 1945, Serial No. 576,705

7 Claims. (Cl. 260—309.5)

This application is a continuation-in-part of my copending application Serial No. 484,638, filed April 26, 1943.

This invention relates to the preparation of monomeric N,N' methylene bis-hydantoins and substituted hydantoins and to certain new chemical compounds thereby produced. More particularly, it is directed to the preparation of N,N' methylene bis-hydantoins, including bis-hydantoins containing one or more alkyl substituents in the 5-position and in which the total number of carbon atoms in the substituent groups does not exceed 5, by a process wherein a hydantoin is reacted with formaldehyde or paraformaldehyde in an aqueous medium comprising concentrated hydrochloric acid, there being present in said reaction medium a salt of zinc or cadmium which serves to catalyze the reaction.

The invention also relates to certain new chemical compounds which can be readily prepared by this process, including N,N' methylene bis 5-alkyl hydantoins in which at least one substituent group contains more than one carbon atom and the total number of carbon atoms in the substituent group does not exceed 5.

My invention is particularly useful in the case of alkyl substituted hydantoins containing a substituent in the 5-position having more than one carbon atom. These hydantoins tend to give liquid products on reaction with formaldehyde in the absence of zinc or cadmium chlorides.

Hydantoin, a chemical compound having the formula:

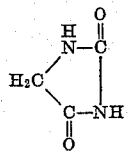

is also available in the form of its 5-monoalkyl and 5,5-dialkyl derivatives, all of said hydantoins being represented generally by the formula:

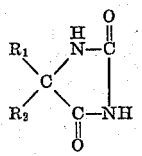

wherein $R_1$ and $R_2$ represent hydrogen or alkyl, and may be the same or different radicals.

The principal object of this invention is the development of a new and improved process for the preparation of N,N'-methylene bis-hydantoins, including N,N'-methyl bis-hydantoins containing one or two alkyl substituents in the 5-position of the hydantoin groups, the total number of carbon atoms in the substituents not exceeding 5, by reacting the hydantoin or substituted hydantoin with formaldehyde (or source of formaldehyde, for example, paraformaldehyde) in an aqueous reaction medium strongly acidified with hydrogen chloride and containing either zinc chloride or cadmium chloride as the reaction catalyst. The zinc or cadmium chloride may be added as such or these salts may be formed by the addition of a soluble zinc salt or of a soluble cadmium salt to the strongly acidic reaction medium. The reaction occurring may be represented generally by the following equation:

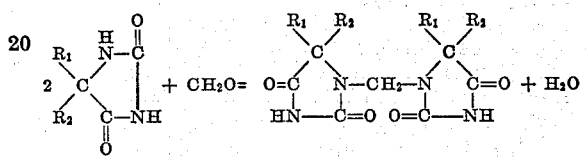

wherein $R_1$ and $R_2$ represent hydrogen or the same or different radicals, the total number of carbon atoms in the alkyl radicals not exceeding 5. The alkyl radicals may be straight-chain or branched-chain, up to and including 5 carbon atoms. Both $R_1$ and $R_2$ may be hydrogen or $R_1$ or $R_2$ may be hydrogen, methyl, ethyl, n-propyl, isopropyl, n-butyl, isobutyl, tert. butyl, or amyl, and if $R_1$ and $R_2$ both represent alkyl radicals they may be methyl, methyl; methyl, ethyl; methyl, propyl; methyl, butyl; ethyl, ethyl; or ethyl, propyl (including the isomeric propyl and butyl alkyls).

By the use of zinc chloride or cadmium chloride as the catalyst in the aqueous solution strongly acidified with hydrogen chloride it is possible to utilize temperatures in the range of 30° C. to 100° C. In place of formaldehyde any material equivalent to formaldehyde in the acid solution, such as paraformaldehyde or trioxane may be employed.

It is generally preferred to have the hydantoin and the formaldehyde present in the reaction mixture in the approximate proportion of one mole formaldehyde for each two moles of hydantoin. If, in preparing the reaction mixture, it is inexpedient to have the hydantoin and formaldehyde in the exact proportions referred to, it is then preferred that the hydantoin, rather than the formaldehyde, be present in excess. Excess hydantoin, i. e., in excess of two moles per mole of formaldehyde, does not react and hence must be recovered or wasted. Excess formaldehyde, on the other hand, favors formation of resinous by-products.

Although there are individual differences between the various alkyl hydantoins, in general, the reaction mixture, at the initiation of the reaction, must contain a quantity of water within the limits 15 to 35% by weight. The mixture must also contain hydrogen chloride to the extent of at least one part hydrogen chloride to four parts water by weight. The quantity of zinc chloride or cadmium chloride present may range from approximately 0.5% to 50% by weight of the reaction mixture. The concentration of hydrogen chloride necessary to obtain good yields of methylene derivatives from hydantoins containing 4 or 5 carbon atoms in the substituent groups must be higher than that required for the hydantoins containing a lesser number of carbon atoms in the substituent groups. Concentration ranges of hydrogen chloride in the reaction mixture for best yields of methylene bis derivatives are listed below for three substituted hydantoins:

|  | Per cent hydrogen chloride in reaction mixture |
|---|---|
| Dimethyl hydantoin | 5- 9 |
| Methyl ethyl hydantoin | 9-14 |
| Methyl isobutyl hydantoin | 16-19 |

The ratio of hydrogen chloride to water required respectively for the above examples should be equivalent to hydrochloric acid of the following concentrations: 10-40% for dimethyl hydantoin, 25-40% for methyl ethyl hydantoin, and 40% for methyl isobutyl hydantoin. In the case of methyl isobutyl hydantoin, in order to obtain the best yields, the reaction mixture should be saturated with hydrogen chloride and should contain at least about 8% of the zinc chloride catalyst.

Generally the reaction when the temperature is 50° C. to 70° C. or higher is complete after about 6 hours. While the reaction generally proceeds more rapidly at temperatures close to 100° C., the net yield of product is somewhat less at these temperatures than at relatively lower temperatures.

Both zinc chloride and cadmium chloride are suitable as catalysts, the amount giving most satisfactory results being generally in the neighborhood of 50 grams per mole of formaldehyde reacted. The zinc or cadmium may be introduced into the reaction mixture in the form of any soluble salt or compound of these metals, as the hydrochloric acid present will convert part or all of these compounds to the chlorides of these metals. The reaction is generally slower with 5-monoalkyl or 5,5-dialkyl hydantoins wherein the alkyl substituents are of greater length containing up to 5 carbon atoms, but as long as the alkyl substituent or substituents are lower alkyl groups as herein defined, I have obtained satisfactory yields of product regardless of the substituent within reaction periods of reasonable duration utilizing my acidic reaction medium and zinc or cadmium chlorides as the catalyst.

The reagent concentrated hydrochloric acid of density 1.19, containing 37% of hydrogen chloride, will give very satisfactory results, as will acid prepared by saturation with hydrogen chloride gas (equivalent to approximately 43% HCl concentration).

In general, glass-lined or stoneware equipment is recommended, although any material resistant to the strong acid of the reaction medium may be employed for the reaction vessel. An agitator of relatively high power, but not necessarily a rapid agitator, is desirable in order to secure intimate contact of the reactants. I have found that the volume of the reaction vessel is preferably one approximating three times that of the reaction mixture, thereby permitting adequate dilution of the concentrated acid reaction medium in washing and recovering the product. The filter used to remove the product from the reaction medium must be resistant to hydrochloric acid, and the resulting product is dried in a drying oven or by means of a heated drum drier. As ordinary crude hydantoin or monoalkyl or dialkyl derivatives thereof may contain traces of cyanides, suitable precautions should be taken to avoid exposure to any hydrogen cyanide fumes resulting when acid is added to the hydantoin.

The N,N' methylene bis-hydantoins are solids of high stability and possess the property of forming salts with bases and metals. They dissolve in alkaline solutions and are reprecipitated by acids. They are also soluble in methanol, ethanol, and glacial acetic acid. They are valuable as compounds possessing both alkaline and acidic properties to a certain degree and, when chlorinated, they yield valuable active chlorine compounds suitable for various uses in industrial and home processes.

As examples of my new and improved method for the manufacture of N,N' methylene bis-hydantoins, which hydantoins may contain one or more lower alkyl substituents in the 5-position, the following may be given.

EXAMPLE 1

N,N' methylene bis dimethyl hydantoin 5,5-dimethyl hydantoin in the amount of 63.2 gram moles was reacted with 37% formaldehyde solution equivalent in amount to 31.6 gram moles of formaldehyde. Zinc chloride in the amount of 720 grams was utilized as a catalyst. The reaction medium consisted of 4.5 liters of concentrated hydrochloric acid (density 1.19).

The concentrated hydrochloric acid was placed in a ten-gallon stoneware crock fitted with a glass heating coil and double-bladed stirrer. The crock was then immersed in a hot water bath, and zinc chloride dissolved in the acid. In place of zinc chloride any other soluble zinc salt could be used, as this would react with the hydrochloric acid to form zinc chloride in the reaction medium. Also, the zinc salt could be replaced by a cadmium salt, thus introducing cadmium chloride as catalyst.

The dimethyl hydantoin was then added, with agitation, to the reaction medium and the crock and its contents heated to 70° C. The aqueous formaldehyde solution was next added over a period of 15 minutes, heating being continued during this period. The steam supply to the heating coil was then shut off since the reaction at this point became exothermic in character and a rise of temperature to 100° C. or to 105° C. is possible. When the temperature fell below this range the steam supply was turned on again from time to time, to an extent sufficient to insure a temperature in the neighborhood of 100° C.

After one hour and 40 minutes the reaction was substantially complete and from 2 to 4 gallons of water was added to break up the solidified product. The product was then filtered off from the reaction medium and washed repeatedly in warm water. It was purified by dissolving the crude product in caustic solution and then filtering, the product being reprecipitated from this solution by neutralization with hydrochloric acid. Finally the purified product was filtered off, washed free of acid, and dried at a temperature of 120° C.

The yield was 6856 grams of N,N' methylene bis 5,5-dimethyl hydantoin having the following formula:

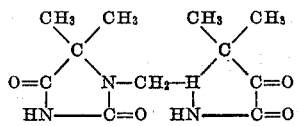

This is a yield of 81% on the basis of the 5,5-dimethyl hydantoin used up in the reaction.

If necessary in order to cool the slurry during the reaction period, cold water or hydrochloric acid in an amount equivalent to 2 to 3 liters may be added sometime during the course of the reaction. In this way excessive thickening of the reaction mixture can be avoided.

EXAMPLE 2

*N,N' methylene bis 5-methyl, 5-ethyl hydantoin*

5-methyl, 5-ethyl hydantoin in the amount of 2891 grams (19.2 moles) was reacted with 761 grams (9.4 moles $CH_2O$) of 37% formaldehyde solution in a reaction medium comprising 470 grams of zinc chloride catalyst and 940 cubic centimeters of concentrated hydrochloric acid. Additional hydrogen chloride gas was added to the reaction mixture in amount sufficient to saturate the mixture.

The hydrochloric acid-containing reaction medium was placed in a round-bottomed flask of 12 liters capacity fitted with a stirrer, gas inlet and thermometer. The zinc chloride catalyst was dissolved in the hydrochloric acid and the 5-methyl, 5-ethyl hydantoin added thereto. One-half of the formaldehyde necessary was then introduced and the slurry saturated by the addition of hydrogen chloride gas.

During the first part of the reaction the temperature of the reaction mixture was maintained at 60 to 65° C., the contents of the flask being subjected to agitation. After 30 minutes the remaining amount of formaldehyde was added and the reaction mixture again saturated with hydrogen chloride gas. After four hours the temperature of the reaction mixture was elevated to 80 to 85° C. and maintained approximately in this range for two more hours. At the end of this time 6 liters of cold water was added to the reaction medium which was stirred until the solidified product had been thoroughly dispersed therein. The product was then filtered off, washed repeatedly in warm water, and dried.

The N,N' methylene bis 5-methyl, 5-ethyl hydantoin resulting was recovered in the amount of 2270 grams, representing a yield of 82% of the theoretical based on the amount of formaldehyde utilized.

EXAMPLE 3

*N,N' methylene bis 5-methyl, 5-isobutyl hydantoin*

In preparing this product 1.07 moles (35 grams) of 95% paraformaldehyde was utilized. This was reacted with 5-methyl, 5-isobutyl hydantoin in a reaction medium comprising 200 cubic centimeters of concentrated hydrochloric acid and containing 200 grams of zinc chloride as catalyst. The amount of 5-methyl, 5-isobutyl hydantoin utilized was equivalent to substantially 2 moles (340 grams).

The zinc chloride was first dissolved in the concentrated acid and the 5-methyl, 5-isobutyl hydantoin added. The slurry was then saturated with hydrogen chloride gas and the paraformaldehyde added.

The temperature was maintained approximately in the range 30 to 35° C. and the reaction mixture allowed to stand for approximately 5 days. At the end of that time the reaction mixture was diluted by the addition of 3 liters of water, and then agitated to break up the caked product, the solid product was filtered off, washed twice in two liters of boiling water, and dried in an oven at 110° C.

The recovery was approximately 237.5 grams of N,N'-methylene bis 5-methyl, 5-isobutyl hydantoin, constituting a yield of approximately 67.5% based on the amount of the dialkyl hydantoin reacted.

EXAMPLE 4

*N,N' methylene bis 5-mono-n-propyl hydantoin*

In preparing this product 0.03 gram moles of 37% aqueous formaldehyde solution was reacted with 0.06 gram moles of 5-n-propyl hydantoin. The reaction medium consisted of 2.5 grams concentrated hydrochloric acid (37%) containing as catalyst approximately 0.4 gram of zinc chloride.

The zinc chloride was first dissolved in the acidic reaction medium, and the 5-mono-n-propyl hydantoin and formaldehyde solution were then added. The reaction mixture was allowed to stand overnight at a temperature of 30 to 35° C. It was then diluted by the addition of water, and filtered to recover the solid product. This product, N,N' methylene bis-5-n-propyl hydantoin, was washed free of acid and dried at a temperature of 110° C. The yield was approximately 54% based on the amount of 5-n-propyl hydantoin reacted.

EXAMPLE 5

*N,N' methylene bis-5-methyl, 5-isopropyl hydantoin*

In preparing this product 400 grams of zinc chloride were dissolved in 476 grams concentrated hydrochloric acid (37%). To this solution was added 680 grams of 5,5-methyl, isopropyl hydantoin. When this had been stirred into the mixture 70 grams of paraformaldehyde was added, and the resultant mixture was saturated with hydrogen chloride gas. The reaction mixture was then allowed to stand for approximately 20 days, after which it was poured into 6 liters of cold water with agitation, and allowed to stand until the product had crystallized. The product was then filtered from the solution and washed with boiling water. A yield of 463 grams N,N' methylene bis 5-methyl, 5-isopropyl hydantoin was obtained.

My new chemical compounds may be generically represented by the formula:

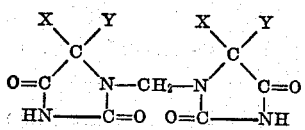

wherein X and Y represent the same or different radicals selected from the group which consists of hydrogen and lower alkyl radicals, at least one of which contains at least two carbon atoms.

The observed physical properties of the N,N' methylene bis derivatives of 5,5-dimethyl hydantoin, 5-methyl, 5-ethyl hydantoin, 5-methyl, 5-isobutyl hydantoin, and 5-n-propyl hydantoin are given in the following table:

N,N' methylene bis derivatives of:

|  | 5,5-dimethyl hydantoin | 5-methyl 5-ethyl hydantoin | 5-methyl 5-isobutyl hydantoin | 5-n-propyl hydantoin |
|---|---|---|---|---|
| Molecular weight | 168 | 296 | 352 | 296. |
| Color | colorless | colorless | colorless | colorless. |
| Melting point | 295–296° C | 258–259° C | 213–220° C.[1] | 205–207° C. |
| Solubility in water— | | | | |
| (a) at 25° C | 0.5% | 0.08% | 0.05% | |
| (b) at 100° C | 2.0% | 0.69% | 0.05% | |
| Solubility in tetrachlorethane (25° C.) | 0.04% | 0.09% | 2.08% | |

[1] The N,N' methylene bis-5-methyl 5-isobutyl hydantoin is apparently a mixture of stereo-isomers, from which it is impossible to obtain a product of sharp melting point.

Various modifications of the process as described above with reference to certain preferred embodiments thereof will occur to those skilled in the art. It is, therefore, understood that various changes may be made in the amounts, temperatures and procedures given herein as illustrative of those preferred embodiments without departing from the spirit or scope of my invention.

I claim:

1. The method of preparing an N,N' methylene bis hydantoin having the formula

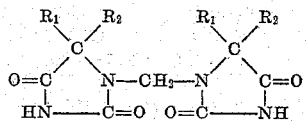

wherein $R_1$ and $R_2$ represent the same or different radicals selected from the group which consists of hydrogen and alkyl radicals which comprises reacting a hydantoin having the formula

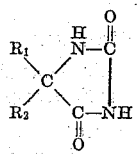

$R_1$ and $R_2$ representing the above-identified radicals, and in which the total number of carbon atoms in $R_1$ and $R_2$ does not exceed 5, with formaldehyde in an aqueous reaction mixture containing, at the initiation of the reaction, the hydantoin and formaldehyde in the approximate proportion of one mole of formaldehyde for each two moles of the hydantoin, water in an amount between 15% and 35% by weight of the reaction mixture, at least one part hydrogen chloride for each four parts of water, and a metallic chloride taken from the group consisting of zinc chloride and cadmium chloride.

2. The method of preparing an N,N' methylene bis hydantoin having the formula

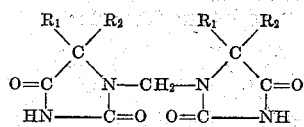

wherein $R_1$ and $R_2$ represent the same or different radicals selected from the group which consists of hydrogen and alkyl radicals which comprises reacting a hydantoin having the formula

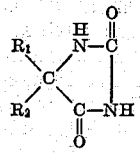

$R_1$ and $R_2$ representing the above-identified radicals, and in which the total number of carbon atoms in $R_1$ and $R_2$ does not exceed 5, with formaldehyde in an aqueous reaction mixture containing, at the initiation of the reaction, the hydantoin and formaldehyde in the approximate proportion of one mole of formaldehyde for each two moles of the hydantoin, water in an amount between 15% and 35% by weight of the reaction mixture, at least one part hydrogen chloride for each four parts of water, and a metallic chloride taken from the group consisting of zinc chloride and cadmium chloride, said reaction being carried out at a temperature within the range 30° C. to 100° C.

3. The method of preparing an N,N' methylene bis hydantoin having the formula

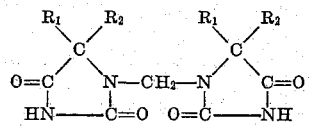

wherein $R_1$ and $R_2$ represent the same or different radicals selected from the group which consists of hydrogen and alkyl radicals which comprises reacting a hydantoin having the formula

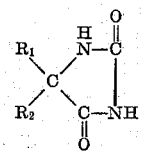

$R_1$ and $R_2$ representing the above-identified radicals, and in which the total number of carbon atoms in $R_1$ and $R_2$ does not exceed 5, with formaldehyde in an aqueous reaction mixture containing, at the initiation of the reaction, a hydantoin and formaldehyde in the approximate proportion of one mole of formaldehyde for each two moles of the hydantoin, water in an amount between 15% and 35% by weight of the reaction mixture, a metallic chloride taken from the group consisting of zinc chloride and cadmium chloride, and sufficient hydrogen chloride to substantially saturate the reaction mixture.

4. A process for the production of N,N' methylene bis-dimethyl hydantoin which comprises reacting 5,5 dimethyl hydantoin with formaldehyde in an aqueous reaction mixture containing, at the initiation of the reaction, the hydantoin and formaldehyde in the approximate proportion of one mole of formaldehyde for each two moles of said hydantoin, water in an amount between 15% and 35%, and hydrogen chloride between 5% and 9%, by weight of the reaction mixture, and a metallic chloride taken from the group consisting of zinc chloride and cadmium chloride.

5. A process for the production of N,N' methylene bis-methyl, ethyl hydantoin which comprises reacting 5-methyl, 5-ethyl hydantoin with formaldehyde in an aqueous reaction mixture containing, at the initiation of the reaction, the hydantoin and formaldehyde in the approximate proportion of one mole formaldehyde for each two moles of said hydantoin, water in an amount between 15% and 35%, and hydrogen chloride between 9% and 14%, by weight of the reaction mixture, and a metallic chloride taken from the group consisting of zinc chloride and cadmium chloride.

6. A process for the production of N,N' methylene bis-methyl, isobutyl hydantoin which comprises reacting 5-methyl, 5-isobutyl hydantoin with formaldehyde in an aqueous reaction mixture containing, at the initiation of the reaction, the hydantoin and formaldehyde in the approximate proportion of one mole formaldehyde for each two moles of said hydantoin, water in an amount between 15% and 35%, and hydrogen chloride between 16% and 19%, by weight of the reaction mixture, and a metallic chloride taken from the group consisting of zinc chloride and cadmium chloride.

7. As a new chemical compound N,N' methylene bis-5-methyl, 5-isobutyl hydantoin.

JOSEPH FREDERIC WALKER.

REFERENCES CITED

The following references are of record in the file of this patent:

UNITED STATES PATENTS

| Number | Name | Date |
| --- | --- | --- |
| 2,155,863 | Jacobson | Apr. 25, 1939 |
| 2,225,384 | Graenacher | Dec. 17, 1940 |

OTHER REFERENCES

Annalen, vol. 365, pages 38–49.